(12) United States Patent
Cartier et al.

(10) Patent No.: US 9,452,595 B2
(45) Date of Patent: Sep. 27, 2016

(54) MULTI-LAYER BREATHABLE FILMS

(75) Inventors: Laurent B. Cartier, Wayne, PA (US); Fabrice R. Chopinez, Bala Cynwyd, PA (US)

(73) Assignee: Arkema Inc., King of Prussia, PA (US)

( * ) Notice: Subject to any disclaimer, the term of this patent is extended or adjusted under 35 U.S.C. 154(b) by 322 days.

(21) Appl. No.: 14/111,218

(22) PCT Filed: Oct. 3, 2011

(86) PCT No.: PCT/US2011/054549
§ 371 (c)(1),
(2), (4) Date: Oct. 11, 2013

(87) PCT Pub. No.: WO2012/141735
PCT Pub. Date: Oct. 18, 2012

(65) Prior Publication Data
US 2014/0030495 A1    Jan. 30, 2014

Related U.S. Application Data

(60) Provisional application No. 61/474,407, filed on Apr. 12, 2011.

(51) Int. Cl.
| | |
|---|---|
| *B32B 27/08* | (2006.01) |
| *B32B 7/02* | (2006.01) |
| *B32B 27/30* | (2006.01) |
| *B32B 27/34* | (2006.01) |
| *C08G 69/40* | (2006.01) |
| *C08L 77/06* | (2006.01) |
| *B32B 27/12* | (2006.01) |
| *B32B 27/28* | (2006.01) |
| *C08L 23/08* | (2006.01) |

(52) U.S. Cl.
CPC ............. *B32B 27/08* (2013.01); *B32B 7/02* (2013.01); *B32B 27/12* (2013.01); *B32B 27/285* (2013.01); *B32B 27/308* (2013.01); *B32B 27/34* (2013.01); *C08G 69/40* (2013.01); *C08L 77/06* (2013.01); *B32B 2270/00* (2013.01); *B32B 2274/00* (2013.01); *B32B 2307/724* (2013.01); *C08L 23/08* (2013.01); *Y10T 428/2495* (2015.01)

(58) Field of Classification Search
None
See application file for complete search history.

(56) References Cited

U.S. PATENT DOCUMENTS

| | | | |
|---|---|---|---|
| 5,800,928 A | 9/1998 | Fischer et al. | |
| 5,869,414 A | 2/1999 | Fischer et al. | |
| 6,072,005 A * | 6/2000 | Kobylivker | B32B 27/12 524/536 |
| 6,348,258 B1 * | 2/2002 | Topolkaraev | B29C 55/005 428/317.9 |
| 6,506,695 B2 * | 1/2003 | Gardner | B32B 38/06 428/196 |
| 6,645,336 B1 * | 11/2003 | Albertone | B32B 27/12 156/244.11 |
| 6,770,234 B2 | 8/2004 | Osborn et al. | |
| 2004/0029467 A1 * | 2/2004 | Lacroix | B32B 27/12 428/474.4 |
| 2005/0025920 A1 | 2/2005 | Stolarz et al. | |
| 2007/0155900 A1 * | 7/2007 | Chang | A61F 13/4902 525/88 |
| 2009/0269532 A1 * | 10/2009 | Ferreiro | B32B 27/18 428/36.91 |
| 2010/0003486 A1 * | 1/2010 | Lalgudi | B32B 7/12 428/220 |

FOREIGN PATENT DOCUMENTS

| | | |
|---|---|---|
| EP | 560630 | 9/1993 |
| EP | 1 650 022 | 4/2006 |

\* cited by examiner

*Primary Examiner* — David Sample
*Assistant Examiner* — Donald M Flores, Jr.
(74) *Attorney, Agent, or Firm* — Thomas F. Roland

(57) ABSTRACT

The invention relates to a breathable multi-layer film with at least one layer containing a breathable resin, such as block copolymers with polyether blocks, and one layer containing a soft polymer (Tg<0° C.), such as a polyolefin. The film is selectively permeable to water vapor but not permeable to water. The film can be bonded to a woven or non-woven substrate to produce a breathable fabric.

19 Claims, No Drawings

MULTI-LAYER BREATHABLE FILMS

This application claims benefit, under U.S.C. §119 or §365 of PCT Application Number PCT/US2011/054549, filed Oct. 3, 2011, and U.S. Provisional Application No. 61/474,407, filed Apr. 12, 2011.

FIELD OF THE INVENTION

The invention relates to a breathable multi-layer film with at least one layer containing a breathable resin, such as block copolymers with polyether blocks, and one layer containing a polymer (Tg<0°C), such as a polyolefin. The film is selectively permeable to water vapor but not permeable to water. The film can be bonded to a woven or non-woven substrate to produce a breathable fabric.

BACKGROUND OF THE INVENTION

Breathable polymer films have the ability to be waterproof, yet be permeable to water vapor. This property makes the films useful in such applications as house wrap, and for breathable protective wear—such as for sporting use, medical use, military use, shoes, and protective bedding. The films may be applied to woven and non-woven materials for permanent or disposable use.

Breathable mono-layer films can be produced using polyether-block-polyamides (PEBA), and polyetheresteramides, as described in U.S. Pat. Nos. 5,800,928; 5,869,414; and US 2004/0029467. Unfortunately PEBA polymers have very poor adhesive properties. In order to improve adhesion, some amount of a polyolefin-based polymer is blended with the PEBA to form a film that can be bonded to a woven or non-woven material by the use of an adhesive, or by heat lamination. The films should have good drawability and flexability, and be easily extruded. The films in the art are a blend of the block copolymer with a copolymer of ethylene/alkyl(meth)acrylate that may optionally be functionalized. In addition to improving adhesion, the ethylene/alkyl(meth) acrylate improves processability and the appearance of the film. Diluting the more expensive PEBA with a cheaper polyolefin also reduces cost. The down-side to adding the polyolefin is that it reduces the breathability of the film, thus the blends of the PEBA and the polyolfin must be properly balanced for optimal final properties.

A multi-layer house wrap is described in EP 1,650,022 having a non-woven layer bonded to a moisture control layer, a tie layer of ethylene vinyl acetate, and a layer of copolyetheresters.

US 2010/0003486 describes a DEET resistant PEBA film, and articles made from it by lamination or adhesion. The hydrophilic polyether block is believed to provide breathability, while the polyamide block provides water-proof properties. Two or more different PEBA copolymers, having different ratios of polyether blocks to polyamide blocks can be blended to optimize the breathability and water-resistant properties.

Mono-layer films combining PEBA with ethylene/alkyl (meth)acrylate for housewrap applications generally combine about 30 wt % of an alloy of two different PEBA copolymers having different ratios of PE to PA blocks, with about 70% of ethylene/alkyl(meth)acrylate. The highly breathable PEBA (high polyether block) unfortunately lacks good processibility, and must be combined in an alloy with a less breathable, but more processible, PEBA having a higher polyamide block percentage.

The present invention solves the problem of producing a very highly breathable film, while also providing good adhesion onto a polypropylene or other substrate, by using a multi-layer film having at least one thin layer with a blend of a polyolefin and a breathable resin, and a second thicker layer having a high level of breathable resin with a lower level of polyolefin. When a polyether-block-polyamide (PEBA) copolymer breathable resin is used, the PEBA used can have a high level of polyether blocks for excellent breathability, while the film is easily processable in an extrusion or coextrusion coating process. The thinner layer(s) with a higher level of polyolefin serves as a bonding layer with a woven or non-woven substrate; while the thicker, mostly PEBA layer provides highly breathable, water-resistant layer.

SUMMARY OF THE INVENTION

The invention relates to a multi-layer breathable film, having at least two layers:
 a) at least one thinner layer (A) comprising a blend of;
  1) one or more breathable resins
  2) one or more soft polymers having a Tg of less than 0° C; and
 b) at least on thicker layer (B) comprising one or more breathable resins, where layer A comprises at least 10 weight percent less breathable resin than layer (B).

The invention also relates to a breathable article formed from extrusion coating or extrusion laminating the multi-layer breathable film onto one or more substrate layers, and o the process for forming the breathable article.

DETAILED DESCRIPTION OF THE INVENTION

The invention relates to a multi-layer, breathable film, having at least two layers at least one layer being a thicker, highly breathable layer, and at least one layer being a thinner layer having a higher level of polyolefin. The thinner layer is a blend of breathable resin and soft polymer, while the highly breathable layer is preferably also formed from a blend of breathable resin and soft polymer.

The "breathable resin" as used herein refers to a resin that can form a breathable film. The breathable resin is preferably chosen from a polyether-block-amide, a polyester block amide, a copolyester thermoplastic elastomer, or a thermoplastic urethane elastomer (TPV). Copolyesters include, for example, ARNITEL from ASM and HYTREL from DuPont.

A preferred breathable resin is poly(ether block amide) polymers, such as PEBAX resins from Arkema Inc. These result from the polycondensation of polyamide blocks containing reactive ends with polyether blocks containing reactive ends. Examples include, but are not limited to:
 1) Polyamide blocks containing diamine chain ends with polyoxyalkylene blocks containing carboxylic chain ends.
 2) Polyamide blocks containing dicarboxylic chain ends with polyoxyalkylene blocks containing diamine chain ends obtained by cyanoethylation and hydrogenation of aliphatic dihydroxylated alpha-omega polyoxyalkylenes known as polyether diols.
 3) Polyamide blocks containing dicarboxylic chain ends with polyether diols, the products obtained in this particular case being polyetheresteramides.

Three types of copolymer containing polyamide blocks and polyether blocks may be distinguished. According to a first type, the polyamide blocks containing dicarboxylic chain ends are derived, for example, from the condensation of α,ω-aminocarboxylic acids, of lactams or of dicarboxylic acids and diamines in the presence of a chain-limiting dicarboxylic acid. As an example of an α,ω-aminocarboxylic acid, mention may be made of aminoundecanoic acid, as examples of lactams, mention may be made of caprolactam and lauryllactam, as examples of dicarboxylic acids, mention may be made of adipic acid, decanedioic acid and dodecanedioic acid, and as an example of a diamine, mention may be made of hexamethylenediamine. Advantageously, the polyamide blocks are made of polyamide 12 or of polyamide 6.

According to a second type, the polyamide blocks result from the condensation of one or more α,ω-aminocarboxylic acids and/or of one or more lactams containing from 6 to 12 carbon atoms in the presence of a dicarboxylic acid containing from 4 to 12 carbon atoms, and are of low mass, i.e. they have an $M_n$ of from 400 to 1 000. As examples of α,ω-aminocarboxylic acids, mention may be made of aminoundecanoic acid and aminododecanoic acid. As examples of dicarboxylic acids, mention may be made of adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid $HOOC—(CH_2)_{10}—COOH$. Examples of lactams which may be mentioned are caprolactam and lauryllactam. Polyamide blocks obtained by condensation of lauryllactam in the presence of adipic acid or dodecanedioic acid and with an $M_n$ of 750 have a melting point of 127-130° C.

According to a third type, the polyamide blocks result from the condensation of at least one a, o-aminocarboxylic acid (or a lactam), at least one diamine and at least one dicarboxylic acid. The α,ω-aminocarboxylic acid, the lactam and the dicarboxylic acid may be chosen from those mentioned above. The diamine may be an aliphatic diamine containing from 6 to 12 atoms and may be arylic and/or saturated cyclic. Examples which may be mentioned are hexamethylenediamine, piperazine, 1-aminoethylpiperazine, bisaminopropylpiperazine, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM).

In the second and third types, the various constituents of the polyamide block and their proportion may be chosen in order to obtain a melting point of less than 150° C. and advantageously between 90° C. and 135° C.

The number-average molar mass of the polyamide blocks is between 300 and 15 000 and preferably between 600 and 5 000. The mass $M_n$ of the polyether blocks is between 100 and 6 000 and preferably between 200 and 3 000.

The polyamide portion of the block may be formed by polymers containing polyamide blocks and polyether blocks are disclosed in patents U.S. Pat. Nos. 4,331,786; 4,115,475; 4,195,015; 4,839,441; 4,864,014; 4,230,838; and 4,332,920.

Copolyamides with a low melting point are disclosed in patents U.S. Pat. No. 4,483,975, DE 3 730 504 and U.S. Pat. No. 5,459,230, and the same proportions of the constituents are adopted for the polyamide blocks.

Copolyamides with a low melting point are disclosed in patents U.S. Pat. No. 4,483,975, DE 3 730 504 and U.S. Pat. No. 5,459,230, and the same proportions of the constituents are adopted for the polyamide blocks.

The polyether blocks may contain units other than ethylene oxide units, such as, for example, propylene oxide or polytetrahydrofuran (which leads to polytetramethylene glycol sequences). It is also possible to use simultaneously PEG blocks, i.e. those consisting of ethylene oxide units, PPG blocks, i.e. those consisting of propylene oxide units, and PTMG blocks, i.e. those consisting of tetramethylene glycol units, also known as polytetrahydrofuran. PPG or PTMG blocks are advantageously used. The amount of polyether blocks in these copolymers containing polyamide and polyether blocks is advantageously from 10% to 50% by weight of the copolymer and preferably from 35% to 50%.

The number-average molar mass $M_n$ of the polyamide sequences can be between 500 and 10 000 and preferably between 500 and 6000. The mass $M_n$ of the polyether sequences can be between 100 and 6000 and preferably between 200 and 3000.

The copolymers containing polyamide blocks and polyether blocks may be prepared by any means for attaching the polyamide blocks and the polyether blocks. In practice, two processes are essentially used, one being a 2-step process, the other a one-step process.

The 2-step process consists firstly in preparing polyamide blocks containing carboxylic ends by condensation of the polyamide precursors in the presence of a chain-limiting dicarboxylic acid and then, in a second step, in adding the polyether and a catalyst. Once the polyamide containing carboxylic acid ends has been prepared, the polyether and a catalyst are then added. The polyether may be added in one or more portions, as may the catalyst. The catalyst is defined as being any product which facilitates the bonding of the polyamide blocks and the polyether blocks by esterification. The catalyst is advantageously a derivative of a metal (M) chosen from the group formed by titanium, zirconium and hafnium. This process and these catalysts are disclosed in patents U.S. Pat. Nos. 4,332,920, 4,230,838, 4,331,786, 4,252,920, JP 07145368A, JP 06287547A and EP 613919.

In the poly(ether block amide) of the invention, the polyether blocks are present at from 10 to 90 weight percent, preferably from 20 to 60 weight percent, and most preferably about 25-50 weight percent. The polyamide blocks are present at from 10 to 90 weight percent, preferably from 40 to 80 weight percent, and most preferably 25-50 weight percent. Higher levels of polyether blocks provide better breathability, but enough polyamide blocks are needed to allow the resin to be processed.

The proper ratio of polyamide to polyether blocks can be found in a single poly(ether block amide), or a blend of two or more different composition poly(ether block amide)s can be used with the proper average composition. In one embodiment, it was found to advantageous to blend a block copolymer having a high level of polyamide groups with a block copolymer having a higher level of polyether blocks, to produce a blend having an average level of polyether blocks of about 10 to 50 weight percent of the total blend of poly(amid-block-ether) copolymers, preferably 20 to 40 weight percent and more preferably about 30 to 35 weight percent. In a preferred embodiment, the blend of two different poly(ether-block-amide)s contains at least one block copolymer having a level of polyether blocks below 35 weight percent, and a second poly(ether-block-amide) having at least 45 weight percent of polyether blocks.

The "soft polymer" which is blended with the breathable resin in each of the layers of the multilayer film of the invention can be any polymer having a Tg of less than 0° C., and preferably less than −20° C. The soft polymer lowers breathability, but improves adhesion and processibility. It allows for the polymer blend to have better film-forming properties so a thinner film can be formed with no pin-holes. Preferably the soft polymers are polyolefins, polyolefin copolymers and alloys thereof. Polyolefins useful in the invention include, but are not limited to ethylene, propylene, 1-butene, 1-hexene, 1-octene or 1-decene, and mixtures thereof.

In one preferred embodiment, the polyolefin is a copolymer of one or more olefins and one or more alkyl(meth) acrylates. The advantage of these copolymers is that the alkyl(meth)acrylate is much more breathable than the polyolefins, and therefore producing a more breathable blend. Examples of olefin/alkyl(meth) acrylates useful in the present invention include, for example, LOTRYL resins from Arkema Inc., such as, copolymers of ethylene with butyl acrylate, methyl acrylate or ethylhexyl acrylate The polyolefin resins and copolymer resins may be functional or non-functional. Examples of useful functional polyolefins useful in the present invention include, but are not limited to LOTADER resins from Arkema Inc., including terpolymers of ethylene/butyl acrylate/maleic anhydride, ethylene/methyl acrylate/maleic anhydride, ethylene/ethyl acrylate/maleic anhydride, and ethylene/methyl acrylate/glycidyl methacrylate.

Layer A

The thinner layer(s) (herein called Layer A) of the multi-layer film is formed from a blend of one or more soft polymers and one or more breathable resins. The level of the breathable resin in the blend is at least 10 weight percent less than the level of breathable resin in the thicker layer (herein called Layer B), preferably at least 20 weight percent less, and more preferably at least 30 weight percent less. It is important to have enough of the soft polymer to allow layer A to stick to a substrate layer. The ratio of breathable resin to soft polymer in Layer A is from 20 to 90 weight percent, more preferably 50 to 85 weight percent, and most preferably from 65 to 80 weight percent breathable resin to respectively 80 to 10, 50 to 15, and 35 to 20 weight percent of the soft polymer.

Each Layer A makes up from 5 to 20%, preferably 10 to 20 percent of the thickness of the total film thickness Layer B Layer B is the thicker and more breathable layer of the multilayer film, making up from 40 to 95%, and preferably from 60 to 90% of the entire film thickness. The breathable layer B may be 100% breathable resin or a blend of breathable resins. However to improve adhesion and processablility, Layer B is preferably a blend of one or more soft polymers with one or more of the breathable resins. The ratio of breathable resin(s) to soft polymer(s) in layer B is higher than in layer A, as previously described. The overall high breathability of the multilayer film is due to the high breathability of Layer B.

In addition to the breathable resin and soft polymer in each Layer A and Layer B, the layers may also contain additives and fillers typical for films, such as dyes and pigments, UV absorbers, impact modifiers, process aids, and fillers. The level of these additives is generally low, below 10 weight percent, and preferable less than 3 weight percent of the total weight of each layer—since the additives generally reduce either the breathability or water resistance of the film layers.

The multilayer films of the invention have two or more layers, with the preferred structures being either an AB, ABA, or ABA' structure. In an ABA structure, the A layers are the same composition, and preferably the same thickness. In an ABA' structure, the A and A' layers have different compositions, and may have the same or different thicknesses.

The total thickness of the film is generally between 10 and 30 microns, though films of up to 150 microns and preferably from 50-125 microns could be made for special applications. If the total film is too thin, there is an increased risk of pinholes from imperfect film formation. One of the advantages of the multi-layer film over monolayer films is that the multi-layer structure helps to seal pinholes than may exist in one of the layers. As the film becomes thicker, the breathability could be reduced.

The films of the invention have a breathability of greater than 10,000 and preferably greater than 15,000 Moisture Vapor transmission rate.

The films of the invention are produced by a coextrusion coating process (for an AB structure), or coextrusion lamination (for an ABA structure). The multilayer film is extruded either onto a substrate layer, or between two substrate layers, with the A layer next to the substrate(s)

The substrate layer onto which the multi-layer film is attached can be any woven or non-woven material. Useful non-woven materials include, but are not limited to polypropylene, polyamide, polyester, polyethylene, and blends thereof. In one preferred embodiment the substrate is a polypropylene spun bond material.

EXAMPLES

Breathability test: The water vapour permeability is measured according to the method described in ASTM standard E 96 method BW (film in contact with water) in a Heraous Votsch oven in conditions of a temperature of 38° C. and an ambient relative humidity of 50%, maintained throughout the period of measurement.

Materials used in Examples:
LOTADER 4603=is an ethylene/methyl acrylate/maleic anhydride terpolymer of 20 wt % methyl acrylate and 0.3 wt % maleic anhydride with a melt index of 8 g/10 nm by ASTM D 1238, available from Arkema Inc.
PEBAX MV 1074 is a polyether block amide polymer available from Arkema Inc.

The following mixtures of LOTADER 4603 and PEBAX MV 1074 were blended on a Buss PR46/70 11 D and extruded to form the following multilayer film layers and film having the listed thicknesses. The results are listed in Tables 1 and 2.

TABLE 1

| ABA Structure | | A Layer | | | B Layer | | | | |
|---|---|---|---|---|---|---|---|---|---|
| (0.6 mil = 15 μm) | | Lotader | Pebax | | Lotader | Pebax | | | |
| Global thickness (μm) | A Thickness (μm) | 4603 content (wt %) | MV1074 content (wt %) | MVTR (g · 25 μm/ m2 · day) | 4603 content (wt %) | MV1074 content (wt &) | MVTR (g · 25 μm/ m2 · day) | Actual ABA film MVTR (g/m2 · day) | Permeation (g · 25 mu/m2 · j) |
| | A//B //A at 5% // 90% // 5% | | | | | | | | |
| 15 | 0.75 | 60 | 40 | 1883 | 30 | 70 | 5223 | 7393 | 4436 |
| 15 | 0.75 | 50 | 50 | 2996 | 35 | 65 | 4666 | 7367 | 4420 |
| 15 | 0.75 | 45 | 55 | 3553 | 35 | 65 | 4666 | 7541 | 4525 |

TABLE 1-continued

| ABA Structure | A Layer | | | B Layer | | | | |
|---|---|---|---|---|---|---|---|---|
| (0.6 mil = 15 μm) | Lotader | Pebax | | Lotader | Pebax | | | |
| Global thickness (μm) | A Thickness (μm) | 4603 content (wt %) | MV1074 content (wt %) | MVTR (g · 25 μm/ m2 · day) | 4603 content (wt %) | MV1074 content (wt &) | MVTR (g · 25 μm/ m2 · day) | Actual ABA film MVTR (g/m2 · day) | Permeation (g · 25 mu/m2 · j) |
| A//B //A at 10% // 80% // 10% | | | | | | | | | |
| 15 | 1.5 | 60 | 40 | 1883 | 20 | 80 | 6337 | 7169 | 4301 |
| 15 | 1.5 | 50 | 50 | 2996 | 35 | 65 | 4666 | 6997 | 4198 |
| 15 | 1.5 | 45 | 55 | 3553 | 35 | 65 | 4666 | 7319 | 4391 |
| A//B //A at 13.3% //73.6% // 13.3% | | | | | | | | | |
| 15 | 2 | 65 | 35 | 1326 | 0 | 100 | 8564 | 5812 | 3487 |
| 15 | 2 | 60 | 40 | 1883 | 10 | 90 | 7450 | 6942 | 4165 |
| 15 | 2 | 50 | 50 | 2996 | 30 | 70 | 5223 | 7265 | 4359 |
| 15 | 2 | 45 | 55 | 3553 | 35 | 65 | 4666 | 7178 | 4307 |
| A//B //A at 20% // 60% // 20% | | | | | | | | | |
| 15 | 3 | 60 | 40 | 1883 | 0 | 100 | 8564 | 5899 | 3540 |
| 15 | 3 | 50 | 50 | 2996 | 20 | 80 | 6337 | 7304 | 4382 |
| 15 | 3 | 45 | 55 | 3553 | 30 | 70 | 5223 | 7327 | 4396 |

TABLE 2

| ABA Structure | A Layer | | | B Layer | | | | |
|---|---|---|---|---|---|---|---|---|
| (0.8 mil = 20 μm) | Lotader | Pebax | | Lotader | Pebax | | | |
| Global thickness (μm) | A Thickness (μm) | 4603 content (wt %) | MV1074 content (wt %) | MVTR (g · 25 μm/ m2 · day) | 4603 content (wt %) | MV1074 content (wt &) | MVTR (g · 25 μm/ m2 · day) | Actual ABA film MVTR (g/m2 · day) | Permeation (g · 25 mu/m2 · j) |
| 20 | 2 | 60 | 40 | 1883 | 0 | 100 | 8564 | 6261 | 5009 |
| 20 | 2 | 50 | 50 | 2996 | 10 | 90 | 7450 | 7179 | 5743 |
| 20 | 2 | 45 | 55 | 3553 | 15 | 85 | 6893 | 7253 | 5802 |
| 20 | 3 | 60 | 40 | 1883 | 0 | 100 | 8564 | 5185 | 4148 |
| 20 | 3 | 50 | 50 | 2996 | 0 | 100 | 8564 | 6873 | 5499 |
| 20 | 3 | 45 | 55 | 3553 | 10 | 90 | 7450 | 7007 | 5606 |

What is claimed is:

1. A multi-layer breathable film having a total film thickness of from 10 to 150 microns, comprising:
   a) at least one thin layer (A), with each layer (A) making up from 5 to 20 percent of the total multi-layer breathable film thickness, comprising a blend of;
      1) one or more breathable resins
      2) one or more soft polymers having a Tg of less than 0° C.; and
   b) at least on one thick layer (B), the thick layer or layers (B) making up from 60 to 95 percent of the total multi-layer breathable film thickness, comprising one or more breathable resins,
   wherein layer (A) comprises at least 10 weight percent less breathable resin than layer (B),
   and wherein the breathable resin is selected from the group consisting of a polyether-block-amide, a polyester block amide, a copolyester thermoplastic elastomer, or a thermoplastic urethane elastomer (TPU), or mixtures thereof, and wherein said multi-layer breathable film contains less than 3 percent by weight of dyes, pigments, UV absorbers, impact modifiers, process aids and fillers in each layer.

2. The multi-layer breathable film of claim 1, comprising:
   a) at least one thin layer (A), with each layer (A) making up from 5 to 20 percent of the total multi-layer breathable film thickness, comprising a blend of;
      1) from 10 to 90 weight percent of said one or more breathable resins; and
      2) from 10 to 90 weight percent of said soft polymers.
   b) at least one thick layer (B), the thick layer or layers (B) making up from 60 to 95 percent of the total multi-layer breathable film thickness, comprising one or more breathable resins, and one or more soft polymers having a Tg of less than 0° C., and wherein the breathable resin is selected from the group consisting of a polyether-block-amide, a polyester block amide, a copolyester thermoplastic elastomer, or a thermoplastic urethane elastomer (TPU), or mixtures thereof.

3. The multi-layer breathable film of claim 2, wherein the soft polymers in (A) and (B) have a Tg of less than −20° C.

4. The multi-layer breathable film of claim 3, wherein the soft polymer is one or more polyolefins.

5. The multi-layer breathable film of claim 4, wherein the soft polymer is a copolymer of one or more olefins and one or more alkyl(meth)acrylates.

6. The multi-layer breathable film of claim 5, wherein an olefin/alkyl(meth)acrylate copolymer is a terpolymer having maleic anhydride or glycidyl methacrylate monomer units.

7. The multi-layer breathable film of claim 2, wherein the layer (A) comprising a blend of;
  1) from 20 to 90 weight percent of said one or more breathable resins; and
  2) from 10 to 80 weight percent of said soil polymers.

8. The multi-layer breathable film of claim 1, wherein the breathable resin is one or more polyether-block-amide (PEBA).

9. The multi-layer breathable film of claim 8, wherein the total ratio of the polyether blocks to polyamide blocks is from 20 to 60 weight percent polyether blocks to 40 to 80 weight percent of polyamide blocks.

10. The multi-layer breathable film of claim 8, wherein the polyether-block amide consists of two or more PEBAs with different ratios of polyether blocks to polyamide blocks.

11. The multi-layer breathable film of claim 1, comprising:
  a) 5-60 weight percent of at least one thin layer (A), with each layer (A) making up from 5 to 20 percent of the total multi-layer breathable film thickness, and
  b) 40-95 weight percent of at least one thick layer (B), the thick layer or layers (B) making up from 60 to 95 percent of the total multi-layer breathable film thickness, and wherein the breathable resin is selected from the group consisting of a polyether-block-amide, a polyester block amide, a copolyester thermoplastic elastomer, or a thermoplastic urethane elastomer (TPU), or mixtures thereof.

12. The multi-layer breathable film of claim 1, wherein one or more layers (A) or (B) may optionally further comprise additives and/or fillers.

13. The multi-layer breathable film of claim 1, having the structure AB.

14. The multi-layer breathable film of claim 1, having the structure ABA.

15. The multi-layer breathable film of claim 1, wherein said film has a total thickness of from 10 to 30 microns.

16. A breathable article comprising at least one woven or non-woven substrate layer and at least one layer of the multi-layer breathable film of claim 1, wherein said Layer (A) is directly attached to a said woven or non-woven substrate layer.

17. The breathable article of claim 16, wherein said substrate is a non-woven selected from the group consisting of polypropylene, polyamide, polyester, polyethylene, and blends thereof.

18. The breathable article of claim 16 having either the structure: substrate/(A)/(B), or the structure substrate/(A)/(B)/(A)/substrate.

19. A process for forming said breathable article of claim 16, wherein said multi-layer film is coextrusion coated or coextrusion laminated onto one or more substrate layers.

* * * * *